United States Patent
Hua

(10) Patent No.: US 7,105,941 B2
(45) Date of Patent: Sep. 12, 2006

(54) FRAMEWORK COMPOSITION WINDMILL

(76) Inventor: Hongsun Hua, No. 12 ZhongGuanCunLu Road, Haidian District, 100032 Beijing (CN)

( * ) Notice: Subject to any disclaimer, the term of this patent is extended or adjusted under 35 U.S.C. 154(b) by 70 days.

(21) Appl. No.: 11/023,016

(22) Filed: Dec. 23, 2004

(65) Prior Publication Data

US 2005/0173928 A1    Aug. 11, 2005

Related U.S. Application Data

(63) Continuation-in-part of application No. 10/380,080, filed as application No. PCT/CN00/00239 on Aug. 17, 2000, now abandoned.

(51) Int. Cl.
*F03D 9/00* (2006.01)
(52) U.S. Cl. .......................... 290/44; 290/55
(58) Field of Classification Search .............. None
See application file for complete search history.

(56) References Cited

U.S. PATENT DOCUMENTS

| | | | |
|---|---|---|---|
| 4,130,380 A * | 12/1978 | Kaiser | 416/197 A |
| 4,204,805 A * | 5/1980 | Bolie | 416/119 |
| 4,525,124 A * | 6/1985 | Watson et al. | 416/132 B |
| 4,624,623 A * | 11/1986 | Wagner | 416/19 |
| 5,299,913 A * | 4/1994 | Heidelberg | 416/197 A |
| 5,798,631 A * | 8/1998 | Spee et al. | 322/25 |
| 6,021,052 A * | 2/2000 | Unger et al. | 363/26 |
| 6,177,735 B1 * | 1/2001 | Chapman et al. | 290/44 |
| 6,283,710 B1 * | 9/2001 | Biscomb | 416/132 B |
| 6,452,287 B1 * | 9/2002 | Looker | 290/55 |
| 6,487,096 B1 * | 11/2002 | Gilbreth et al. | 363/35 |

FOREIGN PATENT DOCUMENTS

DE        3629872 A1 *    3/1988
WO    WO 9618937 A1 *    6/1996

* cited by examiner

*Primary Examiner*—Joseph Waks
(74) *Attorney, Agent, or Firm*—Yi Li

(57) ABSTRACT

A framework composition windmill includes a cylindrical tower and a wind power dynamic component positioned at the top end of the tower. The wind power dynamic component includes a wind-driven rotor and an STS energy exchange coupling element which includes an annular mechanical moving module and an annular stationary electronic module. The stationary electronic module is installed on a support structure, and the mechanical moving module is connected to, and driven by the wind-driven rotor, rotating relative to the stationary electronic module. The wind-driven rotor includes at least two blades and a flexible bow-shaped framework; each of the blades being installed on and supported by the bow-shaped framework and vertically connected at bowstring end of the bow-shaped framework. With this wind power dynamic component, the speed of the rotor can be automatically adjusted to match the speed of the energy exchanger and to obtain optimal efficiency.

8 Claims, 4 Drawing Sheets

FRAMEWORK COMPOSITION WINDMILL

CROSS REFERENCE TO RELATED APPLICATION

This application is a continuation-in-part of patent application Ser. No. 10/380,080, filed Feb. 16, 2003, now abandoned which is a national stage application of PCT patent application No. PCT/CN00/00239 under 35 U.S.C. 371, filed Aug. 17, 2000. All prior patent applications are herein incorporated by reference in their entirety.

FIELD OF THE INVENTION

The present invention involves wind power generation equipment. More specifically, it is a framework composition windmill.

BACKGROUND OF THE INVENTION

Wind power is one of ideal green energies. It is inexhaustible, particularly in the case of generating electricity. The primary working principle of electricity generation through wind power is to utilize wind power to drive wind-driven rotors, such as the blades of a windmill, which then in turn drive the rotation of an electrical generator, thereby transforming the mechanical energy into electrical energy. Although the principle of electricity generation through wind power is extremely simple, its application in actual processes is very limited. Current statistical data shows that, even in a relatively developed wind power generating country such as the United States, wind power generation only makes up for a very small proportion of the total amount of electricity generated. The most significant reason for this is that wind power is an extremely unstable energy source. For example, the 65-kilowatt wind power generation equipment used in California's Altamont Pass, a concentrated wind power site in the United States, have 48-foot diameter rotors and a designed wind speed of 35 mph. Their average cost per kilowatt hour is approximately US$0.05. If, however, this wind power generation equipment were installed in any other region, there would be changes in the triangular relationship between the decreased effective wind speed, the cost effectiveness, and the wind speed. If it is used in an area of distribution type wind power, the technical and economic instruction standards would decrease to a level that would make it difficult to meet the consumer's needs. When wind power device being used in the Xilin pasture lands of Inner Mongolia, for example, the average wind speed in July each year drops to 6.3 mph, and the original 65 kilowatt power rating equipment drops to 0.4 kilowatts. Actually, in the areas with the richest wind power resources in China, the average annual wind speed is only 10 mph. Because China is a country with limited wind power resources, the existing wind power generation equipment described above are not suited in this region.

In summary, the main reason that wind power generation cannot be commercially adopted over a large area is that the design parameters for each wind power generation device are determined according to general environmental conditions. These parameters often are based on the installation environment of the wind power generation equipment—i.e., the wind power resources—and the equipment are designed with a predetermined objective after undergoing a great deal of aerodynamics testing. For these reasons, when the wind power generation equipment leaves the factory, its design parameters cannot be randomly adjusted in accordance with the actual working conditions or, if they can, the range of adjustment is extremely narrow. Because the parameters of wind power resources cannot be fixed, the design parameters of wind power generation equipment cannot always be matched with the wind power resource conditions even through meticulous design. When the conditions are not matched, the power generation efficiency is extremely low. For example, manufacturers usually design small-size wind power generation equipment for a wind speed of greater than 11 m/s, but the average wind speed in actual operating environments of small-size wind power machinery can only reach 3~5 m/s. For this reason, the actual power output often can only reach one tenth of the rated power output.

In addition, the more advanced wind power generation equipment currently available in the world use the type of propeller rotor or axial flow rotor used in aerospace technology. Testing has shown that propeller rotors and axial flow type rotors operate optimally under conditions of high-speed airflow. In general, the diameter of an airplane propeller rotor does not exceed 3 meters, but the power output can reach 600~3,000 kilowatts. Although the diameter of a helicopter rotor is somewhat bigger, the operating speed of its blade tip position generally reaches over Mach 0.5. Therefore, use of these types of aerospace technology application propeller rotor structures in wind power generation areas with lower wind speeds (general operating wind speeds of only about 5~10 m/s) is far out of the aerodynamically appropriate range of usage for a propeller rotor. Also, it is very difficult, to lower the manufacturing costs. With its high manufacturing & usage costs and low wind power efficiency, its technological targets make it very difficult for wide distribution of wind power resources and for the products to reach a viable usage level. This type of wind power generation equipment, therefore, can only be used at a wind power generation site with relatively rich wind power resources. Essentially, the application of propeller rotor technology in the realm of wind power generation has been a misleading direction in its technological development. Not only is it disadvantageous to the utilization of wind power resources, but also it has prevented other technological advancement from establishing a large user base.

The earliest human use of wind power stems from popular windmills. People used windmills for irrigation and milling, basically turning wind power into mechanical energy, such as the widely known Dutch windmills. In order to increase the wind power conversion efficiency of windmills, these locally used windmills needed to be designed and installed in accordance with the local wind conditions, and they needed to be individually adjusted so as to achieve the highest wind power/mechanical power conversion efficiency. Individual adjustment methods, however, were not suited to large-scale production of windmills, and the additional adjustment increased the manufacturing and usage costs of the windmills. Even more importantly, once a windmill is installed, its structure is fixed, and it is no longer adjustable. In keeping with the electrical energy demands of modern man, people began to use windmills to generate electricity. Because these popular windmills could not be randomly adjusted according to the wind conditions during operation, their conversion efficiency was similarly compromised. Current use of windmills to generate electricity, therefore, is not fully developed and widely adopted.

Under general conditions, windmills or the propellers in wind power device inventions all increase the torque of the wind power rotors by increasing the diameter. When a wind power rotor with an excessively large diameter encounters strong winds, however, the propeller blades can be easily damaged. Materials such as high strength carbon fibre materials are usually used to manufacture the blades of current wind power generation devices, and the manufacturing costs are extremely high as a result.

SUMMARY OF THE INVENTION

The present invention is directed to a framework composition windmill, which comprises a cylindrical tower and a wind power dynamic component positioned at a top end of the tower. The wind power dynamic component comprises a wind-driven rotor and an STS energy exchange coupling element. The STS energy exchange coupling element comprises an annular mechanical moving module and an annular stationary electronic module, one thereof being magnetic and one thereof being electromagnetic. The stationary electronic module is installed on a support structure, and the mechanical moving module is connected to, and driven by the wind-driven rotor, rotating relative to the stationary electronic module. The wind-driven rotor comprises at least two blades and a flexible bow-shaped framework, each of the blades being installed on and supported by the bow-shaped framework and vertically connected at bowstring end of the bow-shaped framework. Furthermore, the mechanical movement module can further include a speed-increasing mechanical component for handling the speed match between the wind-driven rotor and the triode reversible electro-mechanical transducer.

One object of the present invention is to provide a framework composition windmill that makes a fundamental breakthrough in the limitations of current wind power generation technology and endows wind-driven rotors with artificial intelligence. It can automatically adjust to match the speed between the wind-driven rotors and transducers with the changing wind speed, which ensures the best dynamic response whenever necessary. It can raise the effective wind power conversion efficiency in low wind speed areas, thereby increasing the wind power effective utilisation factor under low wind speed conditions and ensuring operation in all climates of wind power generation in low wind speed areas. These advantages will benefit the utilisation and popularisation of wind power generation technology.

A further object of the present invention is to provide a framework composition windmill in place of the existing wind power generation equipment with complex and costly technologies. It provides easy installation and low maintenance, thereby greatly reducing the costs of wind power generation.

Another object of the present invention is to provide a framework composition windmill using the traditional rotation framework structures of herdsman nationalities. It ensures the safe usage and operation of the windmill structure under different wind power conditions.

DETAILED DESCRIPTION OF THE INVENTION

Figure 1:
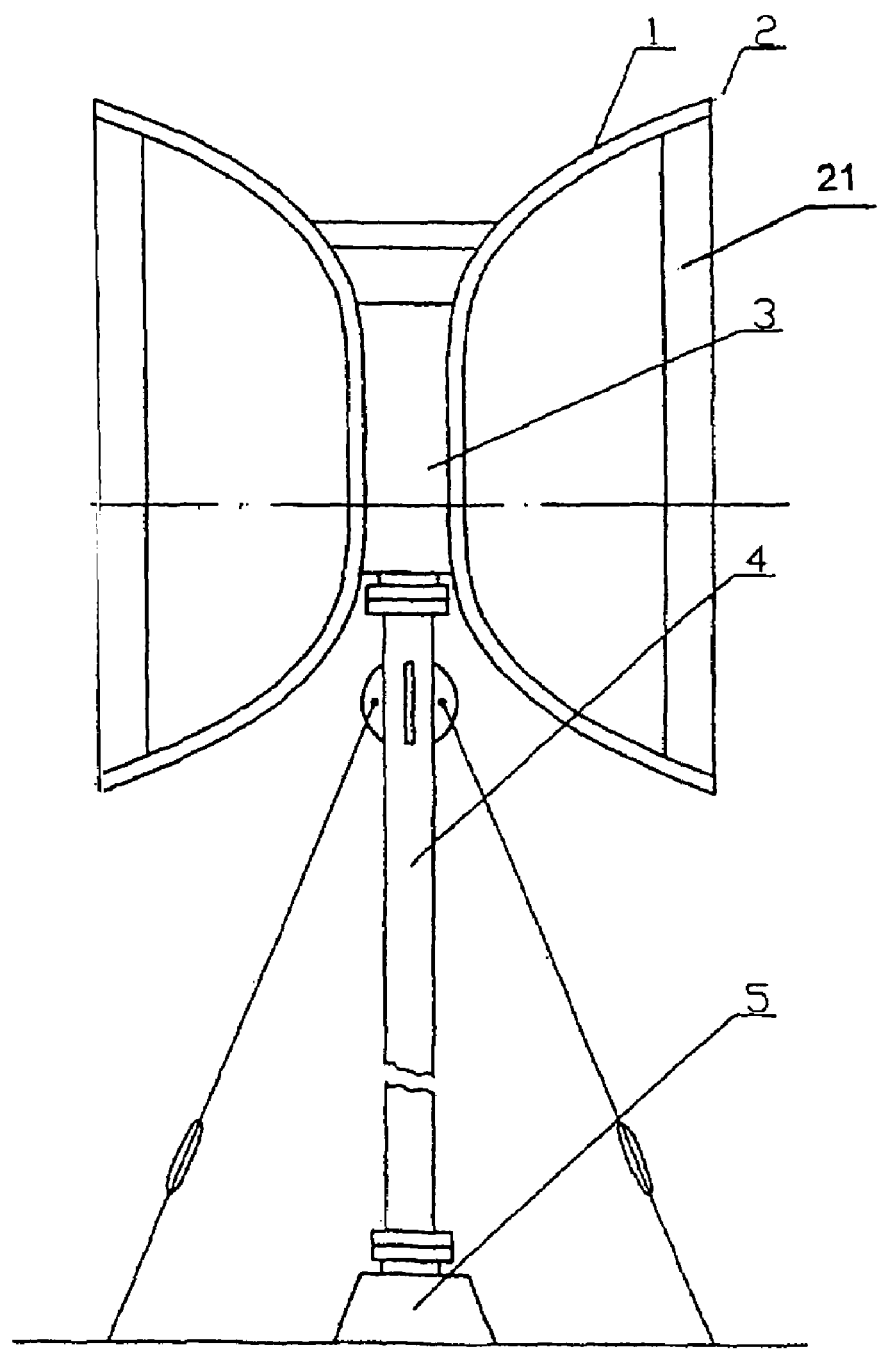
FIG. 1 is a schematic diagram of the structure of the present invention.

As shown in FIG. 1, in one embodiment of the present invention the windmill includes cylindrical tower (4), and wind power dynamic component positioned at the top end of the tower (4). The wind power dynamic component comprises a wind-driven rotor (2) and an STS energy exchange coupling element (3). The wind-driven rotor (2) comprises at least two blades (21) and a flexible bow-shaped framework (1); each of the blades is installed on and supported by the bow-shaped framework (1).

Figure 2:
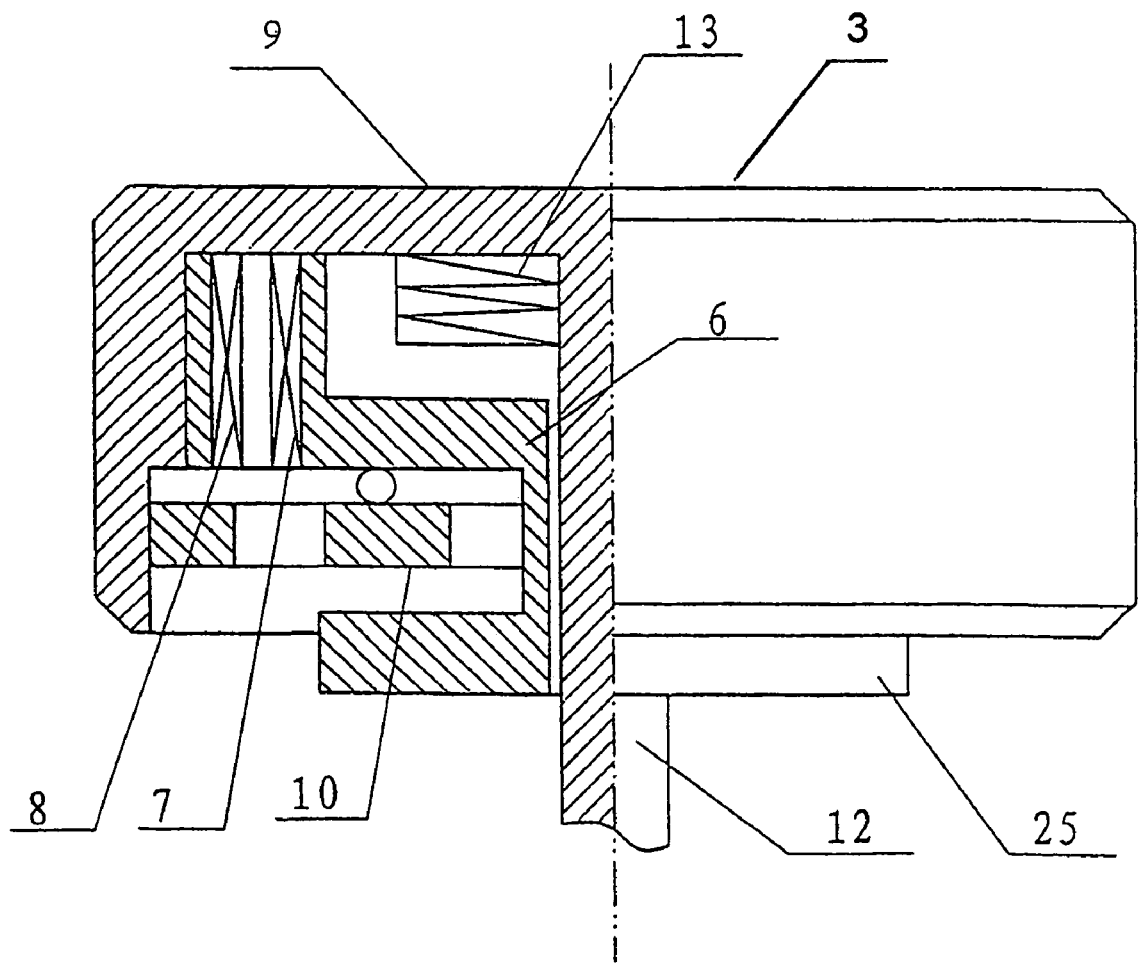
FIG. 2 is a schematic diagram of the structure of the top of the tower of the present invention.

As shown in FIG. 2, the STS energy exchange coupling element (3) comprises an annular mechanical moving module (7), and an annular electronic stationary module (8). The mechanical moving module (7) includes a magnetic drum (6). The electronic stationary module (8) is installed on the support structure, and the mechanical moving module (7) is connected to, and driven by the wind driven rotor (2), rotating relative to the stationary electronic module. One of the two modules is an electromagnetic component, and the other is a magnetic component. In the embodiment shown in FIG. 2, the mechanical moving module (7) is the magnetic component and the electronic stationary module (8) is the electromagnetic component. Alternatively, the mechanical moving module (7) can be the electromagnetic component and the electronic stationary module (8) can be the magnetic component. There is a space of about 0.5 mm to about 2.5 mm between the electronic stationary module (8) and the mechanical moving module (7). The electronic control end (13) that provides a timely control of the STS energy exchange coupling element is located in an appropriate location inside the top end of the windmill equipment. As shown in FIG. 2, the electronic stationary module (8) is fixed inside the housing (9) at the top of the equipment. A fixed cover plate (10) is located at the bottom end of the housing (9). The output terminal of the mechanical moving module (7) is designed as the drive portion (25) connected to the wind-driven rotor (2), and the wind-driven rotor (2) drives the rotation of the drive portion (25). The post (12) passes through the opening in the center of the drive portion (25) and connects with the top end of the tower (4).

The term "STS" used herein is an abbreviation of "Signal-manageable Transforming System", which refers to a triode reversible electro-mechanical transducer. The triode reversible electromechanical transducer was described in detail in Chinese patent application No. 97119117.4 filed in 1997. It is a new type of energy resource usage equipment that can be used to change the power structure of various types of machinery and add artificial intelligence. This equipment has already been designed into broad-spectrum seriated core components that can be conveniently incorporated into various types of specialized equipment and be further incorporated into advanced electromechanical equipments.

More specifically, the triode reversible electromechanical transducer comprises an energy exchange coupling element including a winding element (electromagnetic element) and a magnetic element, and an electronic control means for real-time digital control. The winding element in the energy exchange coupling element is composed of ferrite core and winding. The magnetic element is an embedded element made of rare earth magnetic material after being subjected to magnetization. One of the winding element and magnetic element is fixed to a relatively fixed body, and the other of the winding element and magnetic element is fixed to a relatively movable element for mechanical energy input/output. The winding element of the energy exchange coupling element is connected to an AC/DC two-way reversible converter which is composed of large power electric and electronic switch modules. The two-way reversible converter is connected to a electrical power supply net as a main power port. There is also provided a programmable controller sharable with other equipment, for real-time control of the AC/DC two-way reversible converter and energy exchange coupling element. The programmable controller is provided with standard communications interface as an information control end. The STS energy exchange coupling element is equivalent to a combination of a stator and a rotor in an electric-mechanical transducer.

The working principle of the present invention by utilizing the STS energy exchange coupling element is that the mechanical moving module (7) at the power transduction end is connected to the wind-driven rotor (2) of the windmill through mechanical adaptation. Under the effect of the wind power, the mechanical moving module (7) follows the wind-driven rotor (2) to move rotationally; and an electrodynamic force is produced by the coil winding induction in the electronic stationary module (8). This electrodynamic force is controlled by the two-way reversible changer resulting in the formation of electrical current which complies with the standard of power supply. The electrical current is sent to the power supply network. This process can be achieved through generation of appropriate command adjustments from the STS electronic control end (13) to control the rotation speed of the mechanical moving module (7). This electronic control end (13) is regulated by a software system on the basis of different information on wind speed changes and generates timely adjustments and control commands to the power transduction end. This results in the power transduction end rapidly achieving the best response, thereby endowing the wind-driven rotor (2) with artificial intelligence.

It should be understood that the STS energy exchange coupling element used in the instant windmill is a part of a wind electric generator for converting mechanical energy to electric energy, wherein the mechanical moving module (7) coupled with the wind-driven rotor (2) corresponds to the rotor in the electric generator, while the electronic stationary module (8) connected to the support corresponds to the stator in the electric generator. Between the mechanical moving module (7) and electronic stationary module (8), one is an electromagnetic component, and the other is a magnetic component. They rotate relatively to each other so that the electromagnetic element cuts magnetic line of force in the magnetic field produced by the magnetic element, to produce an electromotive potential. In other words, when the wind rotates the wind-driven rotor (2), the mechanical moving module (7) connected to the wind-driven rotor (2) will rotate accordingly. This movement corresponds to the rotation of the rotor of the electric generator, thus cutting the magnetic line of force, producing electromotive potential, and converting the mechanical energy produced by the wind-driven rotor to electric energy.

However, there is a substantial difference between the STS energy exchange coupling element and the existing electric generator. More specifically, the electricity generating portion in the existing windmill is generally in a form of electric generator, and is a relatively independent unit. The electric generator is mainly composed of a stator, a rotor, an input shaft connected to the rotor and a bearing for supporting the input shaft. All of these components are assembled inside a generator housing. In use, the rotating element of the windmill needs to transfer the dynamic force to the input shaft of the electric generator to rotate the rotor via a mechanical transfer element, such as a gear. Thus, the electric generator has relatively more components and a poor adaptability. If one element fails, the entire windmill will not work, and the probability of failure is high. Furthermore, since it is necessary to transfer dynamic force via a mechanical transfer element, such as a gear, mechanical loss increases.

Using the STS energy exchange coupling element in the present invention, only the mechanical moving module and electronic stationary module, corresponding to the rotor and stator in the electric generator respectively, are assembled to the windmill. Therefore, the conversion from wind energy to electric energy can be performed directly, thereby omitting elements of the generator housing, gear and input shaft, as required by the existing electric generator, and resulting in a compact structure and low failure rate. Moreover, the mechanical energy of the wind-driven rotor can be directly converted to electric energy, without need of dynamic transfer element, thus greatly reducing the mechanical loss. In addition, due to its simple structure, unnecessary energy loss during the energy transfer process is avoided. As a result, the utility of the electric energy for such a windmill can reach as high as 60%. In an area where the annual average wind speed is over 6 m/s, the equipment can be used for 5,000 hours, with the commercial cost of per kilowatt/hour of US$0.07 or less.

Figure 1A:
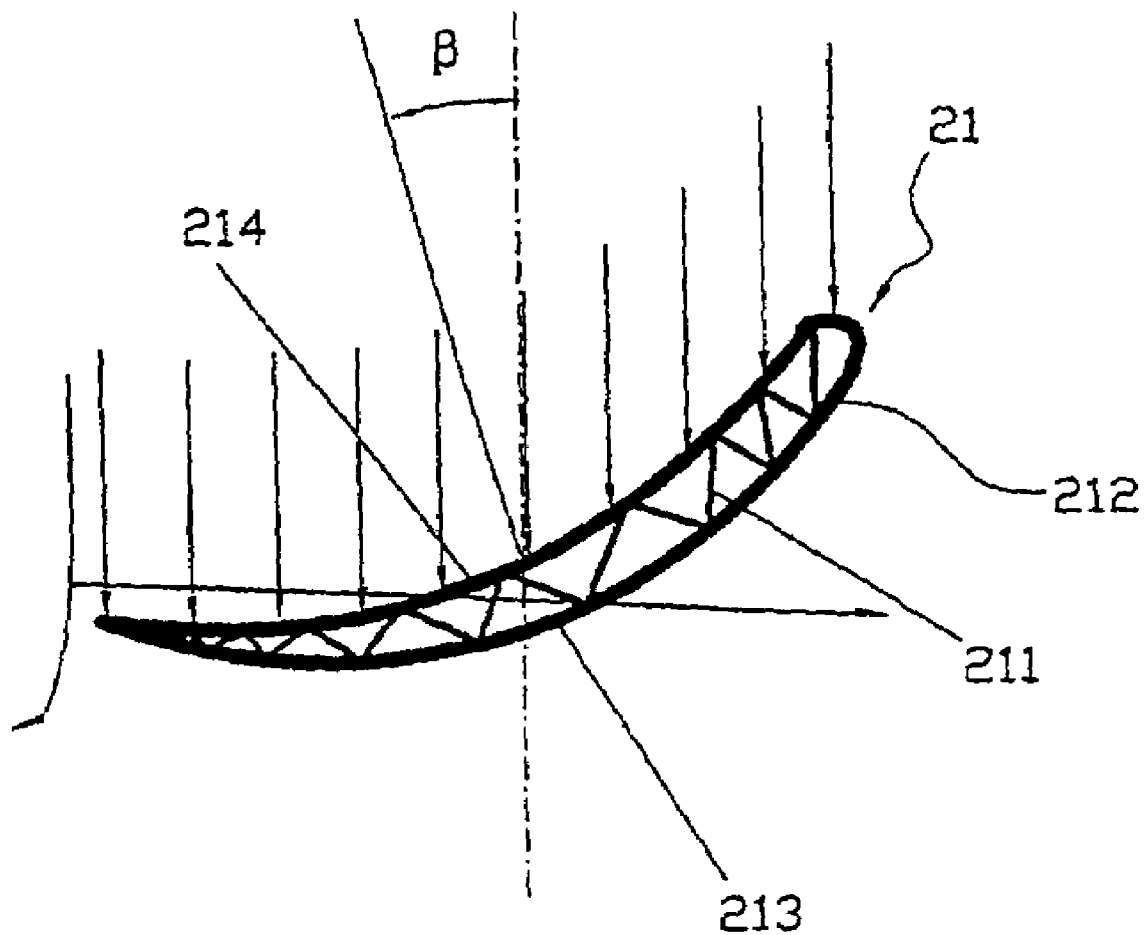
FIG. 1A shows a power acceptance analysis of the blades of the present invention.

Significant advancements have been made in the present invention for the windmill's wind-driven rotor (2). The primary advance has been made with the blades (21) of the windmill rotor. As shown in FIG. 1A, the blades (21) of the wind-driven rotor (2) in the present invention are based on aerodynamic principles, using the optimised design of ternary fluxion value computers. Either sailcloth or fibreglass can be used as the surface material of the blade (21) surface (212). Its cross section is moulded out of a bone structure (211) to form an aerodynamic surface that is the same as that of a glider. The blade (21) that is formed by this aerodynamic surface is vertically supported on the flexible bow-shaped framework (1), as shown in FIG. 1. The outer edge of the blade (21) is the back (213) of the blade surface and has a relatively long line of flow. The inside edge is the belly (214) of the blade surface and has a relatively short line of flow. The front edge of the blade (21) is at the leading edge of the direction of movement.

The wind power and dynamic exchange principle of the present invention is that, with regard to the wind-driven rotors (2), the lateral force after being balanced is dominant on the back (213) of the blade (21) because the lateral force on the belly (214) of the blade (21) in the wind is greater than the lateral force on the back (213) in the wind. In addition, because placement angle β of the blade (21) is less than the tangential path of rotation, a tangential force along the direction of rotation is obtained.

While the wind-driven rotor (2) is rotating, the blade belly (214) obtains lift because the air flow over the blade back (213) is higher than the air flow over the blade belly (214) in accordance with Bernoulli's Principle. This lift causes the rotor to obtain a tangential force along the direction of movement. In appropriately matched conditions of motion speed and wind speed, the wind-driven rotor (2) can obtain a much higher wind power utilisation rate than a common propeller rotor, but it cannot itself control the running status. Its running process must be managed by the control system. Because the blades (21) need to be able to bear tension, it is difficult for general wind power generation equipment to operate under the increasingly complex and exacting work conditions. The present invention can be manufactured so that it is extremely light and portable. Fibreglass can be used for the wing surface (212) material, and expensive carbon fibre materials no longer need to be used.

The aerodynamics of the present invention are similar to those of the wings of a glider, but its support structure is not evenly placed on the single point supported cantilever frames of the two sides of the airframe, rather, it has used a bow-shaped framework (1) to support the vertical tension suspension structure. For this reason, the upward airflow used by a glider acts as the lift for gliding flight, while the present invention uses level wind force as the dynamic force for the wind power equipment. It is exactly the same aerodynamic wing shape, and the glider derives lift and gliding tractive force from the airfoil, while the present invention derives driving rotor rotation tangential force from the blade (21).

The back (213) of the blade (21) in the present invention is relatively long, and the belly (214) of the blade is relatively short. When the wind-driven rotor (2) rotates the airflow passes the blades (21), the pressure on the belly (214) of the blade is higher than on the back (213) of the blade because, according to Bernoulli's Principle, the flow speed of the air flowing passing the back (213) of the blade is higher than the belly (214) of the blade. Only if the placement angle β of the blade (21) is less than the tangential path of the wind-driven rotor's (2) outer edge can the wind-driven rotor (2) obtain driving force in the direction of rotation. Because a structure that is specifically designed for use with low speed wind power is utilised, the structure in the present invention is even better suited to distribution type generation under low wind speed conditions.

The abovementioned wind-driven rotor structure of the bow-shaped framework (1) of the present invention leaves a fixed space at the bottom end of the tower (4) so that it does not have any other supplementary supports. The three to four taut steel cables shown in FIG. 1 are fixed, and because the tower structure is not under an inclination load, it can be installed on a simple concrete foundation (5). The cost of the tower in the present invention is, therefore, considerably less than the towers in current power generation equipment.

An electrical cable of the electric collector component connects with the lower portion of the terminal box through the center of the tower (4) and outputs the current to the electric network.

The most important advances of the present invention with regard to wind power generation equipment is that it directly integrates the wind power dynamic component and the STS energy exchange coupling element into one body. This creates integrated wind power energy equipment that is a single unit of set design. The essence of the invention is that, according to the distribution needs for wind power usage, the aerodynamic conversion element and the STS energy exchange coupling element are directly combined to make a light framework structure and form a wind power transduction and electrical power transduction dual function electronic apparatus. The windmill rotors are uniquely designed with artificial intelligence, enabling them to ensure the most advantageous dynamic responses at any given time, especially under low wind speed conditions. It makes the speed match between the wind-driven rotor and the transducer, and maximizes the wind power conversion efficiency, thereby raising the effective utilisation rate of the wind power. It has been proven through extensive testing and experiments that with the present invention the wind power effective utilisation rate under wind speed conditions of less than 10 mph is more than twice that of conventional wind-driven rotors. The present invention ensures continuous and highly efficient operation of wind power generation equipment in low wind speed areas. This breakthrough in the limitations of current wind power generation technology has been made at fundamental level, which makes commercialisation of wind power generation technology possible.

In addition, the present invention uses wind-driven rotor blades based on the theories of aerodynamics. It uses a traditional style, light framework structure optimally designed using ternary fluxion value calculation. With specific consideration of the situations of low energy quality wind source and high probability of random destruction, the blades are designed into "tense bowstring" style bow-shaped framework structure. Because the mechanical structure of the blades is entirely different from the cantilever beam material mechanics of general wind-driven rotors, the power acceptance situation is simpler, the bow-shaped framework shape and the materials are flexible, and they can automatically flex under strong winds. In addition, they are not easily broken, and the blade length, therefore, has almost no limitation. The present invention is safer to use than traditional windmills.

The aerodynamic design of the present invention's wind-driven rotor is based upon similar aerodynamic principles for a glider. Because the airflow on the back of the blade is greater than on the belly of the blade when the wind-driven rotor is rotating, the force of lift acts on the belly of the blade according to Bernoulli's principle and, acting as a rotor, the rotor causes a tangential force to be obtained. Under appropriate matched conditions between motion speed and wind speed, this wind-driven rotor can obtain a much higher wind power utilisation rate than common propeller rotors, and it is well managed when fitted with this STS control system. This unique structure that helps to accelerate the blade rotation generally does not need to be fit with a gear accelerator. It minimizes loss of wind-driven power, and increases the conversion efficiency of wind power. For these reasons, the present invention is better suited to working in changing climates and low wind speed conditions than the current wind power generation equipment with propeller rotors and axial flow rotors.

Based on the two significant advancements described above, the present invention has broken through the structural limitations of traditional wind power generation equipment and effectively resolved the problem of wind power generation in low wind speed areas. The large amount of test data shows that, in low wind speed areas, the power generation efficiency of the present invention more than twice as high as current wind power generation equipment. With the present invention, the conversion efficiency under 10 mph wind speed conditions can reach over 60%, while current propeller rotor wind power generation equipment can only maintain efficiency of 30% because of mismatch between actual and design wind speed.

The present invention uses traditional types of light framework structures, replacing wind power generation equipment that has complex manufacturing processes and high manufacturing costs. It is easy to install, convenient to maintain and repair, and its manufacturing cost under equally low speed conditions is, therefore, 70% to 80% lower than wind power generation equipment of equal capacity. In addition, this type of tower structure using taut cords generally will not be destroyed by strong winds. Low cost manufacturing and usage can be realised, thereby making the present invention more advantageous to the popularised use of wind power invention technology.

Another advantage of large-scale popularisation of the present invention is that, when the windmills of the present invention are widely distributed, they can form a green protective screen of benefit to environmental protection. If the windmill blade structure of the present invention is used, therefore, the rotating wind-driven rotor causes a tangential force to be obtained because, according to Bernoulli's principle, the airflow over the back of the blade is greater than the belly, and the belly of the blade obtains lift. This tangential force enables the wind-driven rotor to form wind eddies around the wind-driven rotor. These wind eddies can, on the one hand, accelerate the windmill rotation and further increase the energy conversion efficiency of the present invention. On the other hand, they can absorb a large amount of wind energy, so when the windmills of the present invention are, arranged in lines the windmills transform wind energy into kinetic energy, and at the same time they also absorb a large amount of wind power energy and greatly weaken the wind power crossing over the windmill line. The windmill line, therefore, forms a green protective screen by reducing the wind and fixing the shifting sand. Moreover, because the wind speed is controlled using artificial intelligence, it can utilise wind speed in the same way as a grain separation windmill—using the gravity precipitation method to separate the sand and the soil and deposit it on the ground, thereby achieving the effect of desertification prevention.

Figure 3:
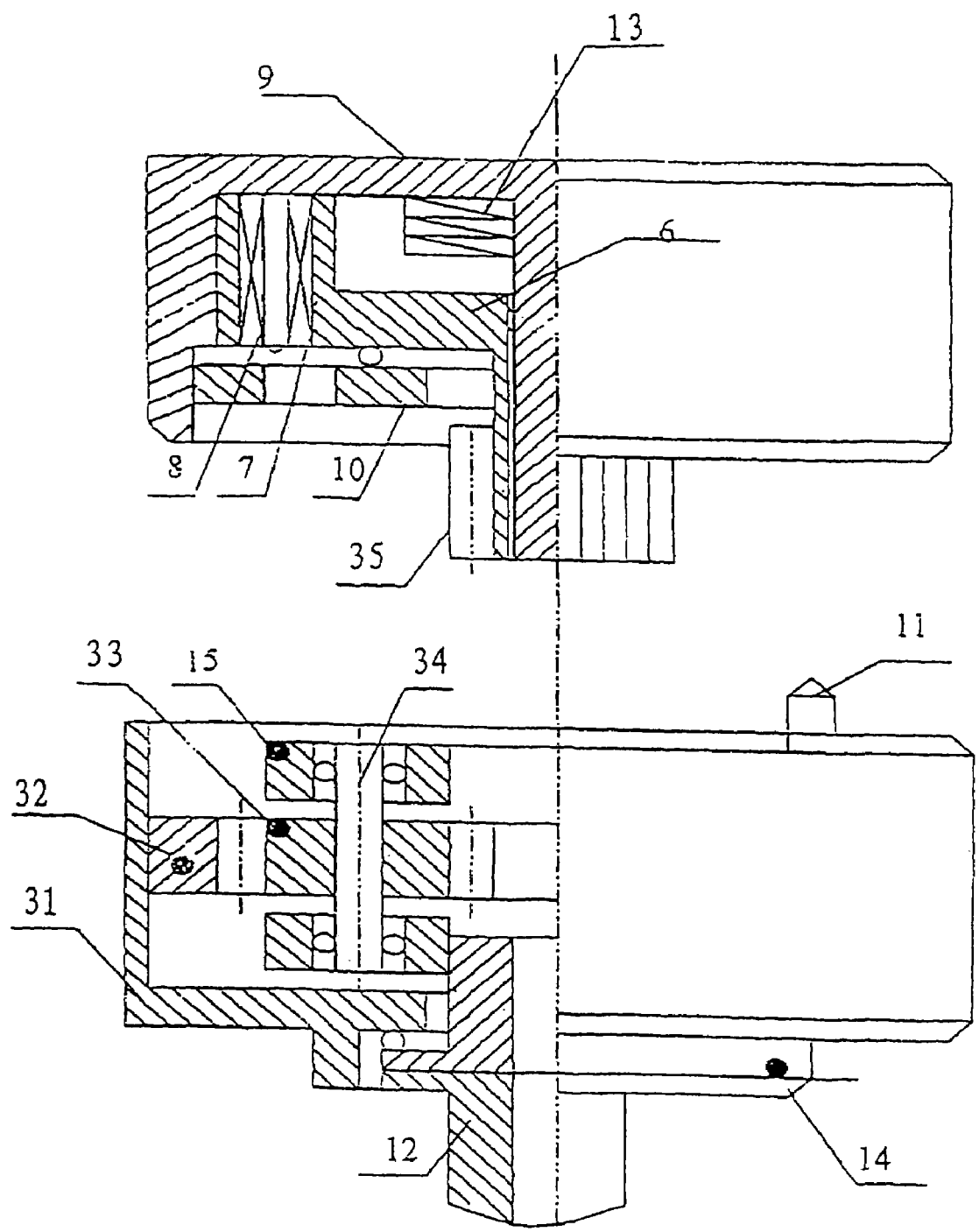
FIG. 3 is a schematic diagram of the structure of the top of the tower of a further embodiment of the present invention.

FIG. 3 shows a further embodiment of the present invention. The basic structure of this embodiment is similar to that described above. The difference is that a speed-increasing mechanical component is included inside the mechanical module (7) to handle the speed match between the wind-driven rotor (2) and the triode reversible electromechanical transducer.

As shown in FIG. 3, the mechanical moving module (7) and the electronic stationary module (8) are two annular components and rotate relative to each other. The mechanical moving module (7) is the magnetic component and the electronic stationary module (8) is the electromagnetic component. The space between the electronic stationary module (8) and the mechanical module (7) is from about 0.5 to about 2.5 mm. The electronic control end (13) that provides a timely control of the STS energy exchange coupling element is located in an appropriate location inside the top end of the windmill equipment. The electronic stationary module (8) is fixed inside the housing (9) at the top of the equipment. The fixed cover plate (10) is located at the bottom end of the housing (9). The output terminal of the mechanical module (7) has a gear wheel (35), and the output terminal is connected by this gear wheel (35) to a planet gear structure inside the lower housing (31) at the top end. The planet gear (33) in this planet gear structure meshes with the gear wheel (35), and the planet gear (33) drives the rotation of the lower housing (31) through the gear ring (32) with which it is meshing. This planet gear mechanism is supported inside the lower housing (31) by the support structure (15). There is a circular flange at the bottom end of rotatable top of the lower housing (31) that acts to connect the driving portion (14) to the wind-driven rotor (2), and the rotation of this driving portion (14) is driven by the wind-driven rotor (2). The post (12) is supported at the bottom end of the lower housing (31) through the support structure (15) described above, and the post (12) is fixed at the top end of the tower (4).

The working principle for this embodiment is the same as that described above. The additional mechanical speed-increasing mechanical component in the present invention can also use other traditional mechanical speed change devices.

In addition, because the signal-manageable transforming system utilized in the present invention is a serialised technological means for physical energy conversion, it has obtained patent rights in China and been designed into seriated foundation products for supplying industrial usage. The present invention combines the aerodynamic wind-driven force component directly with the STS energy exchange coupling element into one entity according to the power usage needs of pastoral regions. In this way, an electronic apparatus with the dual function of wind power exchange and electromechanical exchange has been created and thereby enabled the present invention to bring about structural simplification by using the high technology integrated means of areas with concentrated wind power usage. In pastoral areas, its use simplifies solution to the problem of combining fixed machinery components and standard materials with signal-manageable transforming system into a rational structure that is convenient to maintain and repair. This will further help to popularise implementation of the present invention.

While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents.

I claim:

1. A framework composition windmill comprising a cylindrical tower and a wind power dynamic component positioned at a top end of the tower; the wind power dynamic component comprising a wind-driven rotor and an STS energy exchange coupling element; the STS energy exchange coupling element comprising an annular mechanical moving module and an annular stationary electronic module, one thereof being magnetic and one thereof being electromagnetic; the stationary electronic module being installed on a support structure, the mechanical moving module being connected to, and driven by the wind-driven rotor, rotating relative to the stationary electronic module; and the wind-driven rotor comprising at least two blades and a flexible bow-shaped framework; each of the blades being installed on and supported by the bow-shaped framework and vertically connected at bowstring end of the bow-shaped framework.

2. The framework composition windmill of claim 1, wherein there is a space from about 0.5 mm to about 2.5 mm between the mechanical moving module and the electronic stationary module.

3. The framework composition windmill of claim 2, wherein the windmill further comprises an electrical control terminal located inside the windmill, to timely control the STS energy exchange element.

4. The framework composition windmill of claim 3, wherein the mechanical movement module has therein a speed-increasing mechanical component.

5. The framework composition windmill of claim 1, wherein a lower end of the cylindrical tower has two or more taut cords as a supplementary support.

6. The framework composition windmill of claim 1, wherein a cross-section shape of each of the blades is convex on a back and concave on a belly; and an outer edge of the blade has a longer streamline forming the back of the blade, and an inner edge has a shorter streamline forming the belly of the blade.

7. The framework composition windmill of claim 6, wherein each of the blades is covered with sailcloth or fibreglass material.

8. The framework composition windmill of claim 6, wherein each of the blades is placed vertically at the bowstring end of the bow-shaped framework to form a tension suspension structure.

* * * * *